United States Patent [19]

Peehs et al.

[11] Patent Number: 4,816,193

[45] Date of Patent: Mar. 28, 1989

[54] METHOD FOR THE MANUFACTURE OF OXIDE SINTERED NUCLEAR FUEL BODIES

[75] Inventors: Martin Peehs, Bubenreuth; Heinrich Bayer, Kahl; Ulrich Jenczio; Jürgen Laucht, both of Hanau; Sieghard Hellmann, Erlangen; Gerhard Dichtjar, Langenselbold; Wolfgang Dörr; Georg Maier, both of Herzogenaurach, all of Fed. Rep. of Germany

[73] Assignees: Kraftwerk Union Aktiengesellschaft, Mülheim/Ruhr; Reaktor-Brennelement Union GmbH, Hanau, both of Fed. Rep. of Germany

[21] Appl. No.: 99,687

[22] Filed: Sep. 18, 1987

Related U.S. Application Data

[63] Continuation of Ser. No. 870,226, Jun. 3, 1986, abandoned.

[30] Foreign Application Priority Data

Jun. 3, 1985 [DE] Fed. Rep. of Germany ....... 3519825

[51] Int. Cl.$^4$ .................. G21C 21/00; G21C 3/62; C09K 11/04; G21G 4/00
[52] U.S. Cl. .................. 264/0.5; 252/636; 252/643; 423/251; 423/260; 423/261
[58] Field of Search .............. 252/656, 637, 638, 639, 252/643; 423/261, 260, 251, 253; 264/0.5; 422/159

[56] References Cited

U.S. PATENT DOCUMENTS

| 4,052,330 | 10/1977 | Jensen et al. | 264/0.5 |
| 4,348,339 | 9/1982 | Assmann et al. | 252/643 |
| 4,438,050 | 3/1984 | Dörr et al. | 264/0.5 |
| 4,578,229 | 3/1986 | Assmann et al. | 264/0.5 |

FOREIGN PATENT DOCUMENTS

0078428  5/1983  European Pat. Off. .

OTHER PUBLICATIONS

Bailor, et al., ed. 1973, Comprehensive Inorganic Chemistry, Pergamon Press, Australia, pp. 225–231.

*Primary Examiner*—Howard J. Locker
*Attorney, Agent, or Firm*—Herbert L. Lerner; Laurence A. Greenberg

[57] ABSTRACT

Method for manufacturing sintered oxidic nuclear fuel bodies by molding uranium oxide starting powder, a mixture of uranium oxide and plutonium oxide starting powder or of uranium-plutonium oxide mixed-crystal starting powder to form blanks and by a heat treatment of these blanks with a $U_4O_9$ or $(U, Pu)_4O_9$ crystal phase developed in them to a degree which can be crystallographically detected at a sintering temperature in the range of 1000° to 1400° C. in an oxidizing and subsequently in a reducing gas atmosphere. The starting powder and/or the blanks are preroasted at a roasting temperature below the sintering temperature in a roasting gas atmosphere with oxidizing action and with an oxygen potential in which the $U_4O_9$ $(U, Pu)_4O_9$ crystal phase is developed and cooled down subsequently to a starting temperature below the roasting temperature in an inert or oxidizing cooling-down gas atmosphere. Starting from this starting temperature, the blanks are heated to the sintering temperature in an inert or oxidizing heating gas atmosphere while maintaining the $U_4O_9$ or the $(U, Pu)_4O_9$ crystal phase.

22 Claims, No Drawings

METHOD FOR THE MANUFACTURE OF OXIDE SINTERED NUCLEAR FUEL BODIES

This application is a continuation of application Ser. No. 870,226, filed June 3, 1986, now abandoned.

BACKGROUND OF THE INVENTION

1. Field of the Invention

The invention relates to a method for manufacturing sintered oxidic nuclear fuel bodies from uranium oxide starting powder, a mixture of uranium oxide and plutonium oxide starting powder or of uranium-plutonium oxide mixed crystal starting powder. The starting powder may have the composition $UO_{2+x}$, $PuO_{2+x}$ or $(U,Pu)O_{2+x}$, in which x typically has a value of 0.1. A $U_4O_9$ or $(U,Pu)_4O_9$ crystal phase is developed in the oxidic nuclear fuel starting material and blanks of such material having the crystal phase developed therein are sintered at a temperature of 1000° to 1400° C. in an oxidizing atmosphere and subsequently in a reducing atmosphere.

2. Description of the Prior Art

European patent application No. 0078428 and related U.S. application Ser. No. 436,303 filed Oct. 25, 1982, now U.S. Pat. No. 4,578,229 disclose a method for manufacture of synthetic fuel involving a $U_4O_9$ or $(U,Pu)_4O_9$ crystal phase. Due to the $U_4O_9$ or $(U,Pu)_4O_9$ crystal phase which is developed in the blanks to a crystallographically detectable extent, the sintered oxidic nuclear fuel bodies obtained according to the known method exhibit a microstructure with uniformly distributed coarse grain, which is stable against growth at the operating temperature in a nuclear reactor. Since grain boundary migration no longer occurs, gaseous or highly volatile nuclear fission products such as xenon or iodine cannot be washed to the outside from the nuclear fuel oxide matrix by migrating grain boundaries and build up an undesirable overpressure in the cladding tube of a fuel rod, in which the oxidic sintered nuclear fuel bodies are located in the nuclear reactor. Furthermore, the blanks need not contain sintering additives which have grain growth promoting action and can influence the density of the sintered nuclear fuel bodies.

The $U_4O_9$ or $(U,Pu)_4O_9$ crystal phase is developed in the known method in the blanks while they are being heated to the sintering temperature in a gas atmosphere with oxidizing action. In order to develop this $U_4O_9$ or $(U,Pu)_4O_9$ crystal phase to a sufficient degree, holding times are as a rule required with the known method, in which the blanks are kept at a temperature in the range of 400° C. to 600° C. when heated up to the sintering temperature in the gas atmosphere with oxidizing action. The length of these holding times depends on the oxygen-to-uranium, i.e. O/U-ratio of the uranium oxide starting powder. A uranium starting powder with a typical O/U-ratio of 2.10 requires, for instance, a holding time of at least 1.5 hours at a temperature in the range of 400° C. to 600° C., if the blanks are to be transformed entirely into the $U_4O_9$ or $(U,Pu)_4O_9$ crystal phase.

The concentration of the uniformly distributed coarse grain in the microstructure of the oxidic sintered nuclear fuel body obtained by the known method depends on the oxygen potential which the gas atmosphere with oxidizing action has during the heating up to the sintering temperature and during sintering.

The oxygen potential is defined by the relation $\Delta G_{O_2} = RT\ln p_{O_2}$ with R=the general gas constant, T=the absolute temperature and $p_{O_2}$=the partial oxygen pressure in the gas atmosphere with oxidizing action.

SUMMARY OF THE INVENTION

It is an object of the invention to develop the known method further and to facilitate the concentration of the uniformly distributed coarse grain in the microstructure of the sintered nuclear fuel bodies.

With the foregoing and other objects in view, there is provided in accordance with the invention, a method for the manufacture of sintered oxidic nuclear fuel bodies comprising molding nuclear fuel starting powder selected from the group consisting of uranium oxide starting powder, a mixture of uranium oxide and plutonium oxide starting powder, and uranium-plutonium oxide mixed crystal starting powder to form blanks and heat treatment of the blanks with a $U_4O_9$ or $(U,Pu)_4O_9$ crystal phase developed in them to a degree which can be crystallographically detected at a sintering temperature in the range of 1000° to 1400° C. in an oxidizing gas atmosphere and subsequently in a reducing gas atmosphere, in combination with:

(1) preroasting at least one of (a) blanks formed of nuclear fuel starting powder and (b) the nuclear fuel starting powder at a roasting temperature below the sintering temperature in a roasting gas atmosphere with oxidizing action and with an oxygen potential in which the $U_4O_9$ or $(U,Pu)_4O_9$ crystal phase is developed (2) cooling-down the preroasted blanks or the preroasted starting powder to a starting temperature below the roasting temperature in an inert or oxidizing cooling-down gas atmosphere in which the crystal phase is maintained, and subsequent to cooling-down, molding the preroasted starting powder to form blanks, and (3) heating the blanks with a $U_4O_9$ or $(U,Pu)_4O_9$ crystal phase in them from the starting temperature to the sintering temperature in an inert or oxidizing heating gas atmosphere while maintaining the $U_4O_9$ or the $(U,Pu)_4O_9$ crystal phase.

The starting powder is preroasted to develop at least 20% by weight $U_4O_9$ or $(U,Pu)_4O_9$ crystal phase. The starting powder may be preroasted to convert it completely into the $U_4O_9$ or $(U,Pu)_4O_9$ crystal phase. The preroasted starting powder after cooling down may be mixed with other starting powder to form a powder mixture with a content of $U_4O_9$ or $(U,Pu)_4O_9$ crystal phase of at least 20% by weight. The nuclear fuel starting powder may be formed into blanks by molding and subsequently preroasted to develop at least 20% by weight $U_4O_9$ or $(U,Pu)_4O_9$ crystal phase. The blanks may be converted completely into the $U_4O_9$ or $(U,Pu)_4O_9$ crystal phase. The starting powder may be preroasted to form not only $U_4O_9$ or $(U,Pu)_4O_9$ crystal phase but also a $U_3O_8$ or $(U,Pu)_3O_8$ crystal phase to a crystallographically detectable extent.

The roasting gas atmosphere is preferably air at about atmospheric pressure. Other roasting gas atmosphere such as a mixture of carbon dioxide and oxygen or nitrogen with oxygen may be employed. Preroasting may be at a temperature of 70° to 400° C. for a period of time in the range of 10 minutes to 6 hours. Preroasting may also be conducted at a temperature within the range of 70° to 200° C. for a time of 10 minutes to 2 hours. The preroasting may also be carried out at 200° C. to 400° C. for 10 to 30 minutes. The time of preroasting is of course dependent not only on the temperature but also on the extent of conversion into the crystal phase and also on the roasting gas atmosphere.

Other features which are considered as characteristic for the invention are set forth in the appended claims.

Although the invention is illustrated and described herein as embodied in a method for the manufacture of oxidic sintered nuclear fuel bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DESCRIPTION OF THE PREFERRED EMBODIMENTS

Uranium oxide starting powder, a mixture of uranium oxide and plutonium oxide starting powder or uranium-plutonium oxide mixed crystal starting powder is subjected to treatment to develop a $U_4O_9$ or $(U,Pu)_4O_9$ crystal phase to a degree which can be crystallographically detected. Blanks containing such crystal phase are sintered in an oxidizing atmosphere at a temperature in the range of 1000° to 1400° C. and subsequently in reducing gas atmosphere.

The heat treatment of the starting powder or the blanks during preliminary roasting is independent of the heat treatment in the later sintering of the blanks, so that the concentration of the $U_4O_9$ or $(U,Pu)_4O_9$ crystal phase in the starting powder or in the blanks can be adjusted very accurately to a desired value by the preliminary roasting. Therefore, the concentration of the coarse grain in the microstructure of the sintered nuclear fuel body obtained by the sintering can also be set correspondingly accurately. The adjustment of the bimodal grain size distribution in the oxidic sintered nuclear fuel bodies, permits one to influence, in a targeted manner the plasticity of the sintered nuclear fuel bodies. This plasticity is of importance for the mechanical interaction with the cladding tube of the fuel rod in which the oxidic sintered nuclear fuel bodies are located in the nuclear reactor. Special holding times are not required when the blanks are heated up from the starting temperature to the sintering temperature.

Carbon dioxide or a mixture of carbon dioxide and oxygen or air can be used as the oxidizing gas atmosphere, in which the heat treatment of the blanks takes place at a sintering temperature in the range of 1000° C. to 1400° C. The pressure of this gas atmosphere with oxidizing action is, as a rule, atmospheric pressure. Hydrogen or a mixture of hydrogen and an inert gas, for instance nitrogen or a rare gas can be used, likewise at atmospheric pressure, as the gas atmosphere with reducing action for the subsequent heat treatment in the temperature range of 1000° C. to 1400° C. While the treatment times (sintering time) of the blanks are, as a rule, in the range of 15 minutes to 2 hours at the sintering temperature in the range of 1000° C. to 1400° C. in an oxidizing gas atmosphere, treatment times (reduction time) in the range of 15 min. to 1 hour are, as a rule, chosen in the subsequent heat treatment in a gas atmosphere with reducing action.

The concentration of a $U_4O_9$ or $(U,Pu)_4O_9$ crystal phase achieved by the preliminary roasting in the starting powder or the blanks and also of a $U_3O_8$ or $(U,Pu)_3O_8$ crystal phase can advantageously be determined by determining the lattice constant in the treated blanks by means of X-ray diffractometry (see "Solid State Communications", Vol. 5, Pages 349–352, 1967) or of neutrondiffractometrie (see "Le Journal de Physique", Volume 25, Pages 431–439, 1964).

The invention and its advantages will be explained in greater detail with the aid of the following embodiment examples:

For all embodiment examples, starting powder of $UO_2$ was used which was obtained in accordance with the so-called AUC-process. The AUC-process is described in "Gmelin-Handbuch der Anorganischen Chemie", Uranium, Supplement Volume A3, 1981, on Pages 101 to 104. This starting powder had, for the embodiment examples 1 to 8, an oxygen-to-uranium, i.e. O/U-ratio of 2.10 and for the embodiment example 9, an O/U-ratio of 2.0.

For the embodiment examples 1 and 2, the starting powder was preroasted in a roasting oven in a roasting gas atmosphere at atmospheric pressure, was cooled down in the cooling-down atmosphere at atmospheric pressure to the ambient temperature of 20° C. as the starting temperature, and then compacted into blanks. These blanks were heated in a sintering furnace at a heating gas atmosphere of 1 bar pressure to the sintering temperature, were sintered during a sintering time in a gas atmosphere with oxidizing action and subsequently reduced in the same furnace during a reduction time in a gas atmosphere with reducing action and finally cooled down again to the ambient temperature. In Table I, the process conditions for the embodiment examples 1 and 2, the concentrations of the crystal phases obtained by the preroasting and the concentration of the coarse and the fine grain in the oxidic sintered nuclear fuel bodies obtained are given.

TABLE I

| | Embodiment Example 1 | Embodiment Example 2 |
|---|---|---|
| Roasting temperature | 140° C. | 160° C. |
| Roasting time | 20 minutes | 1 hour |
| Roasting gas atmosphere | air | air |
| Cooling gas atmosphere | air | air |
| Concentration of the $U_4O_9$ crystal phase in the preroasted starting powder | 20% by weight | 100% by weight |
| Heating gas atmosphere | $CO_2$ | $N_2$ |
| Oxidizing gas atmosphere during sintering | $CO_2$ | $CO_2$ |
| Sintering temperature | 1100° C. | 1100° C. |
| Sintering time | 1 hour | 1 hour |
| Reducing gas atmosphere | $H_2$ | $H_2$ |
| Reduction temperature | 1100° C. | 1100° C. |
| Reduction time | 15 minutes | 1 hour |
| Concentration of the coarse grain (25 μm) in the sintered oxidic nuclear fuel bodies | 40% | 100% |
| Concentration of the fine grain (3–5 μm) in the sintered oxidic nuclear fuel bodies | 60% | 0% |

For the embodiment examples 3 and 4, starting powder was mixed with powder which was obtained from starting powder by preliminary roasting as in the embodiment examples 1 and 2 and contained $U_4O_9$ crystal phase. The powder mixture was compacted to form blanks which were processed like the blanks in the embodiment examples 1 and 2 into oxidic sintered nuclear fuel bodies. In Table II, the concentrations of the $U_4O_9$ crystal phase in the mixture components and the contents of the mixture components as well as the concentrations of the coarse and the fine grain in the oxidic sintered nuclear fuel bodies obtained are given.

TABLE II

|  | Embodiment Example 3 | Embodiment Example 4 |
|---|---|---|
| Content of the $U_4O_9$ crystalphase in powder 1 (preroasted starting powder) | 100% | 80% |
| Content of the $U_4O_9$ crystalphase in powder 2 (not preroasted starting powder) | 0% | 0% |
| Content of the powder 1 in the powder mixture | 50% | 70% |
| Content of the powder 2 in the powder mixture | 50% | 30% |
| Concentration of the coarse grain (25 μm) in the oxidic sintered nuclear fuel bodies | 60% | 70% |
| Concentration of the fine grain (3–5 μm) in the sintered oxidic nuclear fuel bodies | 40% | 30% |

For the embodiment examples 5 and 6, starting powders were molded into blanks which were preroasted in a roasting oven in a roasting gas atmosphere at atmospheric pressure and were subsequently cooled down in a cooling gas atmosphere at atmospheric pressure to the ambient temperature of 20° C. as the starting temperature. Subsequently, these blanks were further treated in a sintering furnace like the blanks of the embodiment examples 1 and 2. In Table III, the O/U-ratio in the blanks, the process conditions for the preliminary roasting of these blanks, the concentrations of the $U_4O_9$ crystal phase obtained by this preliminary roasting in the blanks and the concentration of the coarse and the fine grain in the oxidic sintered nuclear fuel bodies for the embodiment examples 5 and 6 are given.

TABLE III

|  | Embodiment Example 5 | Embodiment Example 6 |
|---|---|---|
| Starting value O/U in in the blanks | 2.12 | 2.12 |
| Roasting temperature | 150° C. | 180° C. |
| Roasting time | 30 minutes | 1 hour and 10 minutes |
| Roasting gas atmosphere | air | air |
| Cooling gas atmosphere | air | air |
| Concentration of the $U_4O_9$ crystal phase in the preroasted blanks | 20% | 100% |
| Concentration of the coarse grain (25 μm) in the oxidic sintered nuclear fuel bodies | 40% | 100% |
| Concentration of the fine grain (3–5 μm) in the oxidic sintered nuclear fuel bodies | 60% | 0% |

As can be seen from Tables I to III, concentrations of the coarse and the fine grain in the oxidic sintered nuclear fuel bodies can be adjusted to the desired values in wide ranges.

In embodiment example 7, starting powder was preroasted in a separate roasting oven in a roasting gas atmosphere at atmospheric pressure at a roasting temperature and with a roasting time at which there was generated a $U_3O_8$ crystal phase in addition to the $U_4O_9$ crystal phase. The powder was then cooled down as in the embodiment examples 1 and 2 and compacted into blanks, for which oxidic sintered nuclear fuel bodies were obtained as in embodiment examples 1 and 2.

In the embodiment example 8, blanks obtained by compacting a starting powder with an O/U ratio of 2.12 were preroasted in a roasting oven in a roasting gas atmosphere at atmospheric pressure. A $U_3O_8$ crystal phase in addition to the $U_4O_9$ crystal phase was formed. The blanks are processed further subsequently like the blanks in embodiment examples 5 and 6 to form oxidic sintered nuclear fuel bodies.

In Table IV, the process conditions for the preliminary roasting of the starting powder or the blanks, the concentration of the $U_4O_9$ crystal phase and the $U_3O_8$ crystal phase obtained by this preliminary roasting in the powder or the blanks and the concentration of the coarse and the fine grain in the oxidic sintered nuclear fuel bodies are given.

TABLE IV

|  | Embodiment Example 7 | Embodiment Example 8 |
|---|---|---|
| Roasting temperature | 150° C. | 150° C. |
| Roasting time | 2 hours | 2 hours |
| Roasting gas atmosphere | air | air |
| Concentrations of the $U_4O_9$ crystal phase | 85% in the powder | 83% in the blanks |
| $U_3O_8$ crystal phase | 15% | 17% |
| Concentration of the coarse grain (25 μm) in the oxidic sintered nuclear fuel bodies | 85% | 85% |
| Concentration of the fine grain (3–5 μm) in the oxidic sintered nuclear fuel bodies | 15% | 15% |

The oxidic sintered nuclear fuel bodies obtained in accordance with the embodiment examples 7 and 8 have a density of 10.26 g/cm$^3$ and a so-called open porosity of 0.85% of their volume. The open porosity is the share of the pores in the sintered body which reach the surface of this sintered body. Ambient gases can therefore penetrate into these pores and, gaseous nuclear fission products can also move from the sintered body to the outside.

The sintered bodies obtained by the embodiment example 2 have a density of 10.48 g/cm$^3$ and an open porosity of 1.05% of their volume. Compared with these sintered bodies, the sintered bodies obtained in accordance with the embodiment examples 7 and 8 have a relatively low density and a relatively low open porosity, which is explained by the $U_3O_8$ crystal phase in the blanks from which the sintered bodies according to embodiment examples 7 and 8 are prepared. Due to this relatively low open porosity, these sintered bodies have a lower capacity for moisture from the environmental atmosphere than the sintered bodies obtained in accordance with embodiment example 2. In addition, their liberation rate for gaseous nuclear fission products in a nuclear reactor is smaller than that of the sintered bodies which were obtained in accordance with embodiment example 2. Sintered nuclear fuel bodies obtained in accordance with the embodiment examples 7 and 8 can therefore be dried more easily prior to their being filled into the cladding tube of a fuel rod. In addition, they can after insertion into a nuclear reactor be retained for a longer period of time therein without an excessively high overpressure being built up in the fuel rod due to liberated gaseous nuclear fission products.

In the embodiment example 9, the starting powder obtained by the AUC-process was not reoxidized but drained with a powder temperature of 650° C. directly from the fluidized bed furnace of the process into a reaction vessel in which the starting powder was stirred with nitrogen at room temperature, i.e. 25° C. to cool the powder down to an upper temperature limit. This reaction vessel had a double wall into which a coolant, for instance water, could be filled. After the starting powder had reached the upper temperature limit, a roasting gas atmosphere with a pressure of 1.3 bar and a temperature of 25° C. was introduced into the reaction vessel and the starting powder was stirred and preroasted. The starting powder was cooled during the roasting from the upper temperature at a given cooling rate which decreased to a cooling rate down to a lower temperature limit.

After this lower temperature limit was reached, the roasting gas atmosphere in the reaction vessel was replaced again by nitrogen with a pressure of 1.3 bar as the cooling atmosphere, and the starting powder was cooled down by continuous changing of water in the double wall of the reaction vessel all the way to the starting temperature, i.e. the ambient temperature of 25° C.

The preroasted starting powder, cooled down to the starting temperature, was then treated further like the previously roasted and the cooled down powder in embodiment examples 1 and 2. In Table V, the process condition for the preliminary roasting in the reaction vessel, the concentration of the $U_4O_9$ crystal phase obtained by this preliminary roasting as well as the concentration of the coarse and the fine grain in the oxidic sintered nuclear fuel bodies obtained are given.

TABLE V

|  | Embodiment Example 9 |
|---|---|
| Upper temperature limit for the preroasting of the starting powder | 250° C. |
| Lower temperature limit for the preroasting of the starting powder | 130° C. |
| Cooling rate during preroasting of the starting powder | Starting value 15° C./min. Final value 0.1° C./min. |
| Roasting gas atmosphere | air |
| Concentration of the $U_4O_9$ crystal phase in the preroasted powder | 100% |
| Concentration of the coarse grain (25 μm) in the oxidic sintered nuclear fuel bodies | 100% |
| Concentration of the fine grain (3-5 μm) in the oxidic sintered nuclear fuel bodies | 0% |

According to the embodiment example 9, the preroasting of the starting powder can immediately follow its preparation, i.e. this preroasting can be coupled with the manufacturing method of the starting powder and thereby, separate heating for preroasting purposes can be saved.

The foregoing is a description corresponding, in substance, to German application Pat. No. 35 19 825.7, dated June 3, 1985, international priority of which is being claimed for the instant application and which is hereby made part of this application. Any material discrepancies between the foregoing specification and the specification of the aforementioned corresponding German application are to be resolved in favor of the latter.

We claim:

1. Method for the manufacture of sintered oxidic nuclear fuel bodies comprising molding nuclear fuel starting powder selected from the group consisting of uranium oxide starting powder, a mixture of uranium oxide and plutonium oxide starting powder, and uranium-plutonium oxide mixed crystal starting powder to form blanks and heat treatment of the blanks with a $U_4O_9$ or $(U,Pu)_4O_9$ crystal phase developed in them to a degree which can be crystallographically detected at a sintering temperature in the range of 1000° to 1400° C. in an oxidizing gas atmosphere and subsequently in a reducing gas atmosphere, in combination with:

(1) preroasting at least one of (a) blanks formed of nuclear fuel starting powder and (b) the nuclear fuel starting powder at a roasting temperature below the sintering temperature in a roasting gas atmosphere with oxidizing action and with an oxygen potential in which the $U_4O_9$ or $(U,Pu)_4O_9$ crystal phase is developed (2) cooling-down the preroasted blanks or the preroasted starting powder to a starting temperature below the roasting temperature in an inert or oxidizing cooling-down gas atmosphere while maintaining the $U_4O_9$ or $(U,Pu)_4O_9$ crystal phase, and subsequent to cooling-down, molding the preroasted starting powder to form blanks, and (3) heating the blanks with a $U_4O_9$ or $(U,PU)_4O_9$ crystal phase in them from the starting temperature to the sintering temperature in an inert or oxidizing heating gas atmosphere while maintaining the $U_4O_9$ or the $(U,Pu)_4O_9$ crystal phase.

2. Method according to claim 1, wherein the starting powder is preroasted to develop at least 20% by weight $U_4O_9$ or $(U,Pu)_4O_9$ crystal phase.

3. Method according to claim 2, wherein the starting powder is preroasted to convert it completely into the $U_4O_9$ or $(U,Pu)_4O_9$ crystal phase.

4. Method according to claim 2, wherein the preroasted starting powder after cooling down to the starting temperature is mixed with a quantity of a nuclear fuel powder selected from the group consisting of uranium oxide, plutonium oxide and uranium-plutonium oxide mixed crystal starting powder to form a powder mixture with a content of $U_4O_9$ or $(U,Pu)_4O_9$ crystal phase of at least 20% by weight.

5. Method according to claim 1, wherein the blanks are molded of nuclear fuel starting powder and subsequently preroasted to develop at least 20% by weight $U_4O_9$ or $(U,Pu)_4O_9$ crystal phase.

6. Method according to claim 5, wherein the blanks are preroasted to convert them completely into the $U_4O_9$ or $(U,Pu)_4O_9$ crystal phase.

7. Method according to claim 1, wherein the starting powder or the blanks formed of starting powder are preroasted in the oxidizing roasting gas atmosphere with an oxygen potential at which the $U_4O_9$ or $(U,Pu)_4O_9$ crystal phase is developed and in addition a $U_3O_8$ or $(U,Pu)_3O_8$ crystal phase is formed to a crystallographically detectable extent.

8. Method according to claim 1, wherein the roasting gas atmosphere is a mixture of gases selected from the group consisting of carbon dioxide and oxygen, nitrogen with oxygen, and air at atmospheric pressure.

9. Method according to claim 1, wherein the starting temperature for heating the blanks with a $U_4O_9$ or $(U,Pu)_4O_9$ crystal phase in them is in the range of 20° C. to 30° C.

10. Method according to claim 1, wherein the starting temperature for heating the blanks with a $U_4O_9$ or $(U,$ Pu)$_4$O$_9$ crystal phase in them is at the ambient temperature.

11. Method according claim 2, wherein the roasting temperature is in the range of 70° C. to 400° C. and the preroasting time is in the range of 10 minutes to 6 hours.

12. Method according claim 3, wherein the roasting temperature is in the range of 70° C. to 400° C. and the preroasting time is in the range of 10 minutes to 6 hours.

13. Method according to claim 11, wherein the roasting temperature is in the range of 70° C. to 200° C. and the preroasting time is in the range of 10 minutes to 2 hours.

14. Method according to claim 11, wherein the roasting temperature is in the range of 200° C. to 400° C. and the preroasting time is in the range of 10 minutes to 30 minutes.

15. Method according to claim 1, wherein the starting powder is generated as uranium oxide or uranium-plutonium oxide crystal or mixtures thereof with a powder temperature above the roasting temperature, and is first cooled down in an inert gas atmosphere; and wherein the starting powder is then preroasted from an upper temperature limit to a lower temperature limit in the oxidizing roasting gas atmosphere, and is finally cooled-down in the cooling-down gas atmosphere to the starting temperature.

16. Method according to claim 15, wherein the upper temperature limit is in the range of 170° C. to 280° C. and the lower temperature in the range of 120° C. to 150° C.

17. Method according to claim 16, wherein the upper temperature limit is 250° C. and the lower temperature limit is 130° C.

18. Method according to claim 15, wherein the starting powder is cooled-down during the preroasting between the upper and the lower temperature limit with a starting rate in the range of 10° C./minute to 20° C./minute and with a final rate of about 0.1° C./minute.

19. Method according to claim 15, wherein the starting powder is stirred during preroasting in a reaction vessel in the roasting gas atmosphere with oxidizing action and with an oxygen potential in which the U$_4$O$_9$ or (U,Pu)$_4$O$_9$ crystal phase is developed, and is cooled from the upper to the lower temperature limit by heat transfer to a coolant in a double wall of the reaction vessel.

20. Method according to claim 19, wherein the coolant is filled into the double wall of the reaction vessel with a starting temperature in the range of 20° C. to 30° C.

21. Method according to claim 1, wherein the cooling gas atmosphere contains a gas selected from the group consisting of air, nitrogen, a rare gas, a mixture of carbon dioxide and oxygen or a mixture of nitrogen and oxygen.

22. Method according to claim 1, wherein the heating gas atmosphere has a pressure in the range of 1 to 1.5 bar and contains a gas selected from the group consisting of a rare gas, nitrogen or carbon dioxide.

* * * * *